Sept. 6, 1966 H. L. GELERNTER ETAL 3,270,611
APPARATUS FOR MONITORING RELATIVE CONTRAST
Filed Aug. 24, 1961
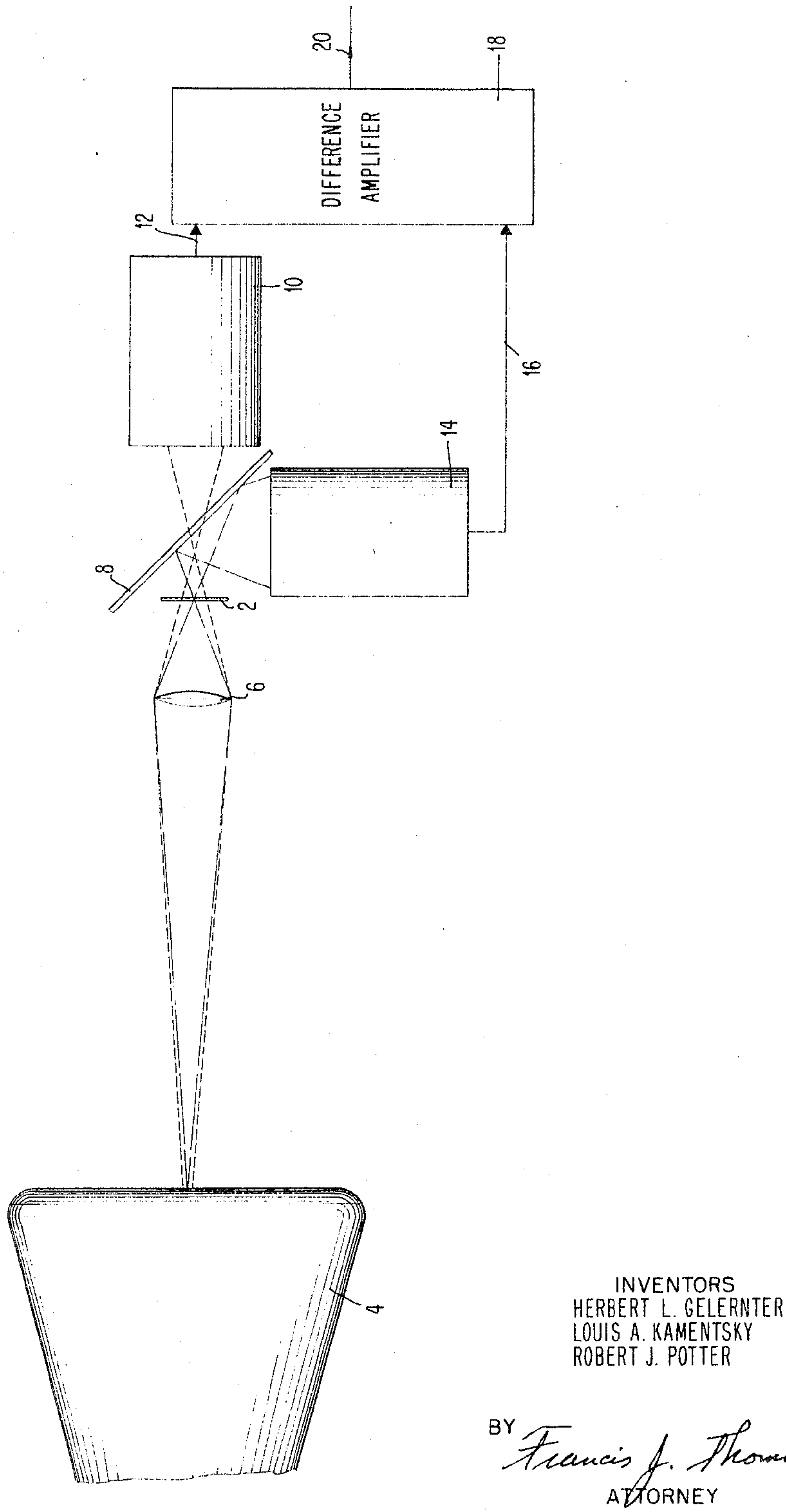
INVENTORS
HERBERT L. GELERNTER
LOUIS A. KAMENTSKY
ROBERT J. POTTER
BY Francis J. Thomas
ATTORNEY United States Patent Office 3,270,611
Patented Sept. 6, 1966

3,270,611
APPARATUS FOR MONITORING RELATIVE CONTRAST

Herbert L. Gelernter, Briarcliff Manor, Louis A. Kamentsky, Katonah, and Robert J. Potter, Ossining, N.Y., assignors to International Business Machines Corporation, New York, N.Y., a corporation of New York
Filed Aug. 24, 1961, Ser. No. 133,678
7 Claims. (Cl. 88—14)

This invention relates to scanning techniques and, in particular, to techniques for monitoring the relative transmittance or reflectance between an object or document area and the surrounding region or area.

In many applications, including data processing and particularly character recognition, documents are optically scanned to generate electrical signals indicative of the data recorded in the document. There are many scanning techniques in general use, including those using flying-spot scanners, code disks, and various other electro-optical and mechanical-optical apparatus. Among the problems encountered in these scanning techniques is that of compensating for deviations in relative contrast between the recorded data and the document itself. In many instances, the relative contrast varies throughout a single document, as, for example, when scanning typewritten text containing erasure smudges.

There are techniques available for compensating for deviations in relative contrast between the recorded data on different documents. One common technique makes use of an additional optical sensing device which operates on a marginal area of the document where it is known that no data is present. It is also possible to compensate for deviations in relative contrast between the recorded data and the document area immediately surrounding the data by alternately scanning areas of the document with a high-resolution (in focus) scan and a low-resolution (blurred) scan, where the low-resolution scan provides an output indicative of the document area immediately surrounding the data.

In the present invention, the objective or document is simultaneously scanned at a high-resolution and at a low-resolution in a single scanning operation. This multi-resolution scanning is accomplished by a single beam of electromagnetic energy such as, for example, light containing energy at separate and distinct wavelength bands, where the energy at one wavelength band is focussed with high precision on the objective or document and the energy at another wavelength band is defocussed (blurred) on the objective or document. The energy at the different wavelength bands is then separately measured to provide an indication of the relative contrast between the objective or recorded data and the region or area surrounding the objective or data.

Although the invention is described with respect to a preferred embodiment employing scanning of data on a document using a light beam, the invention clearly and obviously pertains to the scanning of any objective or specimen with any type of electromagnetic energy.

One object of the present invention is to provide methods and apparatus for monitoring the contrast between data recorded on a document and the document itself.

Another object is to provide methods and apparatus for monitoring the contrast between an objective and the region surrounding the objective.

A further object is to provide methods and apparatus for monitoring the contrast between an objective or recorded data and the region or area surrounding the objective or data with a single scanning operation using electromagnetic energy of more than one resolvable wavelength band.

Another object is to provide methods and apparatus for monitoring the contrast between an objective or recorded data and the region or area surrounding the objective or data with a single scanning operation using electromagnetic energy at a plurality of wavelength bands and an energy separation technique.

A further object is to provide methods and apparatus for monitoring the contrast between an objective or recorded data and the region or area surrounding the objective or data with a single scanning operation using light energy at a plurality of wavelength bands.

A further object is to provide an optical scanning device which generates a plurality of shaped spots permitting the use of mathematical transformation techniques on the recorded data.

Another object is to provide methods and apparatus for monitoring the contrast between an objective or recorded data and the region or area surrounding the data with a single scanning operation using light energy at a plurality of wavelength bands and an energy separation system.

The foregoing and other objects, features and advantages of the invention will be apparent from the following more particular description of a preferred embodiment of the invention, as illustrated in the accompanying drawing.

A preferred embodiment of the invention is shown in the drawing where the object or specimen to be scanned is in the form of a developed photographic transparency 2 containing recorded data which has a different optical density than the background. A cathode ray tube scanner 4 (which is also referred to as a flying-spot scanner), provides a spot of light which is focussed by a lens 6 on the transparency 2. In this embodiment, the lens is not necessarily an achromat; in fact, it may be non-color corrected or designed with a specific chromatic abberation.

The cathode ray tube screen is coated with a phosphor that emits light energy in two distinct wavelength bands. One such phosphor is commercially known as P15, which is described in a publication entitled RCA Phosphors for Cathode Ray Excitation, published in 1957 by the Radio Corporation of America, Harrison, New Jersey, as Form No. TPM–1508. Under focussed electron excitation, this phosphor emits a small, short persistence, spot of light of a wavelength band peaking at approximately 3910 angstrom units (near ultraviolet) and a somewhat larger spot with a longer persistence peaking at a wavelength band of approximately 5100 angstrom units (blue-green).

The ultraviolet energy is focussed on the transparency and the blue-green energy is focussed behind or in front of the transparency. Two phenomena additively contribute to produce the desired effect: the non-corrected lens focusses the blue-green energy at a different (longer) distance than the ultraviolet energy and the blue-green energy is emitted from a larger area on the screen of the cathode ray tube. Obviously either of these two phenomena alone is sufficient to produce a useful result, but the combination of both enhances the operation of the system. In addition, since the persistency of the phosphor is greater for the blue-green energy than for the ultraviolet energy, if the spot is moving (as, for example, in a flying-spot scanner) the blue-green spot is effectively further defocussed. Furthermore, the use of a lens with an appropriate chromatic aberration, in place of the non-corrected lens, further defocusses the blue-green energy.

The energy at the separate wavelength bands is separated by a dichroic mirror 8 which transmits the blue-green energy and reflects the ultraviolet energy. This mirror is constructed of a transparent material, such as quartz or glass, that is coated with a series of dielectric and/or metallic thin films. The mirror is made by carefully controlled evaporation methods and may be designed to reflect all incident light below a specific wavelength and transmit all light above this wavelength. A mirror that is suitable for use in this embodiment of the invention is made by Bausch and Lomb, Inc., Rochester, New York, and is designed to cut at 435± millimicrons with a maximum reflectance between 375 and 435 millimicrons and a maximum transmission between 435 and 600 millimicrons.

The energy transmitted by the dichroic mirror 8 is sensed by a photo-sensitive device 10, such as a photomultiplier tube, to produce an electrical signal on a lead 12 which is indicative of the optical transmittance (or opacity) of the document area immediately surrounding (and including) the area scanned by the focussed ultraviolet energy. Similarly, the focused energy reflected by the mirror 8 is sensed by a photo-sensitive device 14 to produce a signal on a lead 16 which is indicative of the optical transmittance (or opacity) of the document at the point at which the ultraviolet energy is focussed. These signals are combined in a difference amplifier 18 to produce an output signal on a lead 20 which is indicative of the relative contrast between the small document area scanned by the focussed energy and the surrounding document area scanned by the defocussed energy. The difference amplifier includes means for independently controlling the gain of each of its inputs.

The embodiment that has been shown and described is especially suitable for use in the high-speed scanning of developed photographic transparencies. However, the flying-spot scanner can be replaced with any device that emits energy at two or more wavelengths such as an incandescent lamp and two or more filters and the dichroic mirror can be replaced by two or more filters and an appropriate lens system to separate the energy at the various wavelengths.

In the embodiment that has been shown and described, the objective is in the form of a transmitting specimen, and in particular, a transparency. Obviously, the invention can be practiced using other transmitting specimens, such as the well-known punched cards. Similarly the invention can be practiced using reflecting specimens, including paper documents with contrasting markings. In this case, the beam is reflected by the document toward the dichroic mirror or other energy separating device.

The difference amplifier may be replaced by any electronic mathematical operator and the number of inputs may be increased (by using more bands of energy) if other operations are to be performed on the data.

The invention can be practiced using any source of electromagnetic radiation. For example, the cathode ray tube can be replaced with a device for radiating radio-frequency energy at two or more wavelength bands and the dichroic mirror replaced with radio-frequency filter devices, such as narrow band antennas or resonant cavities.

The present invention relates to scanning techniques in general and has been shown and described with respect to an embodiment using optical cathode ray tube scanner. The invention is based on the technique of scanning an objective or document area with energy in two or more wavelength bands, where the energy at one wavelength band is focussed and the energy at another wavelength band is defocussed at the objective or area. The energy in the various wavelength bands is then separated to provide an indication of the relative transmittance or reflection between a small area and its surrounding region or area.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. An apparatus for monitoring the relative contrast between data on a data-bearing document and an area of the document surrounding the data, comprising in combination:

a source emitting radiant energy in two different and non-coextensive wave length bands;

a lens element utilizing its varied refraction character to coaxially focus the energy in the first of said wave length bands at a point on the document and defocus the energy in the second of said wave length bands in an area on the document surrounding and including said point;

a beam splitting element directing substantially all of the energy in said first wave length band and substantially none of the energy in said second wave length band along a first path after reflection from the document, and directing substantially all of the energy in said second wave length band and substantially none of the energy in said first wave length band along a second path after reflection from the document;

means in said first path receiving the energy reflected from said document in said first wave length band and producing a first electrical signal proportional thereto;

means in said second path receiving the energy reflected from said document in said second wave length band and producing a second electrical signal proportional thereto; and means comparing said first and second electrical signals to provide a signal indicative of the relative contrast between said point and the area surrounding said point.

2. An apparatus for monitoring the relative contrast between data on a data-bearing document and the area surrounding the data comprising, in combination:

a source emitting radiant energy in two different and non-coextensive wave length bands;

a lens element utilizing its varied refraction character to coaxially focus the energy in the first of said wave length bands at a point on the document and defocus the energy in the second of said wave length bands in an area on the document surrounding said point;

a beam splitting element directing substantially all of the energy in said first wave length band and substantially none of the energy in said second wave length band along a first path after passage through the document, and directing substantially all of the energy in said second wave length band and substantially none of the energy in said first wavelength band along a second path after passage through the document;

means in said first path receiving the energy passing through said document in said first wave length band and producing a first electrical signal proportional thereto;

means in said second path receiving the energy passing through said document in said second wave length band and producing a second electrical signal proportional thereto; and means comparing said first and second signals to provide a signal indicative of the relative contrast between said point and the area surrounding said point.

3. An apparatus for monitoring the relative contrast between data on a data-bearing document and the region surrounding the data comprising, in combination:

a source coaxially emitting radiant energy in two different and non-coextensive wave length bands;

a lens element utilizing its varied refraction character to focus the energy in the first of said wave length bands at a point on the document and to defocus the energy in the second of said wave length bands in an area on the document surrounding and including said point;

a beam splitting element directing substantially all of the energy in said first wave length band and substantially none of the energy in said second wave length band along a first path after reflection from the document, and directing substantially all of the energy in said second wave length band and substantially none of the energy in said first wave length band along a second path after reflection from the document;

detection means providing a first signal proportional to the energy in said first path;

detection means providing a second signal proportional to the energy in said second path; and comparing means responsive to said first and second signals providing an output signal proportional to the relative contrast between said point on the document and the area of the document surrounding said point.

4. An apparatus for monitoring the relative contrast between data on a data-bearing document and the region surrounding the data comprising, in combination:

a source coaxially emitting radiant energy in two different and non-coextensive wave length bands;

a lens element utilizing its varied refraction character to focus the energy in the first of said wave length bands at a point on the document and to defocus the energy in the second of said wave length bands in an area on the document surrounding and including said point;

a beam splitting element directing substantially all of the energy in said first wave length band and substantially none of the energy in said second wave length band along a first path after passage through the document, and directing substantially all of the energy in said second wave length band and substantially none of the energy in said first wave length band along a second path after passage through the document;

detection means providing a first signal proportional to the energy in said first path;

detection means providing a second signal proportional to the energy in said second path;

comparing means responsive to said first and second signals providing an output signal proportional to the relative contrast between said point and the area surrounding said point.

5. An apparatus for monitoring the relative contrast between data on data-bearing document transparency and the regions surrounding the data comprising, in combination:

a source coaxially radiating light energy in two different and non-coextensive wave length bands;

a lens element utilizing its varied chromatic refraction character to focus the energy in the first of said wave length bands at a point on the transparency and to defocus the energy in the second of said wave length bands in an area on the transparency surrounding and including said point;

dichroic means simultaneously directing all of the energy in the first of said wave length bands along a first path after passage through said transparency and directing the energy in the second of said wave length bands along a second path after passage through said transparency;

means in said first path receiving the energy passing through said transparency in said first wave length band and producing a first electrical signal proportional thereto;

means in said second path receiving the energy passing through said transparency in said second wave length band and producing a second electrical signal proportional thereto; and means comparing said first and second electrical signals to provide an output electrical signal proportional to the relative contrast between said point and the area surrounding said point.

6. An apparatus for monitoring the relative contrast between data on a data-bearing document transparency and the area of the transparency surrounding the data, comprising, in combination:

scanning means comprising a cathode ray tube scanner emitting a first light beam and a second light beam in coaxial relationship one to the other, said light beams being in two distinct and non-coextensive wave length bands;

a lens element utilizing its varied chromatic refraction character to focus said first light beam at a point on the transparency and to defocus said second light beam in an area on the transparency surrounding and including said point;

dichroic means simultaneously directing said first light beam along a first path after passage through said transparency and directing said second light beam along a second path after passage through said transparency;

means responsive to said first light beam in said first path providing a first electrical signal proportional to the energy in said first path;

means responsive to said second light beam in said second path providing a second electrical signal proportional to the energy in said second path; and comparing means responsive to said first and second electrical signals providing an output signal indicative of the relative contrast between said point and the area surrounding said point.

7. An apparatus for monitoring the relative contrast between data on a data-bearing document transparency and the area of the transparency surrounding the data comprising, in combination:

scanning means, comprising a cathode ray tube scanner coaxially and controllably positioning a beam of light having a relatively large amount of energy peaking at approximately 3910 angstrom units and at approximately 5100 angstrom units and having less energy at other wave length bands;

a lens element utilizing its varied chromatic refraction character to focus the energy at approximately 3910 angstrom units at a point on the document and to defocus the energy at approximately 5100 angstrom units in an area on the document surrounding and including said point;

a dichroic mirror located in the path of light passing through the document for essentially reflecting the energy at approximately 3910 angstrom units along a first path and for essentially transmitting the energy at approximately 5100 angstrom units along a second path;

light sensitive means responsive to the energy reflected by said dichroic mirror for providing a first electrical signal proportional to the amount of said reflected energy;

light sensitive means responsive to the energy transmitted by said dichroic mirror providing a second electrical signal proportional to said transmitted energy;

and means comparing said first and second electrical signals for providing a third signal indicative of the relative contrast between the data on the document and the area surrounding the data.

References Cited by the Examiner

UNITED STATES PATENTS

| | | | |
|---|---|---|---|
| 2,797,256 | 6/1957 | Millspaugh | 250—226 X |
| 2,952,075 | 9/1960 | Davis. | |
| 3,035,179 | 5/1962 | Parker | 250—226 |

FOREIGN PATENTS

| | | | |
|---|---|---|---|
| 701,884 | 1/1954 | Great Britain. | |

JEWELL H. PEDERSEN, *Primary Examiner.*

FREDERICK M. STRADER, *Examiner.*

T. L. HUDSON, *Assistant Examiner.*